United States Patent
Zhang et al.

(10) Patent No.: US 9,667,499 B2
(45) Date of Patent: May 30, 2017

(54) SPARSIFICATION OF PAIRWISE COST INFORMATION

(71) Applicants: Yihao Zhang, Chatham, NJ (US); Gordon Wilfong, Florham Park, NJ (US); Michael Scharf, Stuttgart (DE)

(72) Inventors: Yihao Zhang, Chatham, NJ (US); Gordon Wilfong, Florham Park, NJ (US); Michael Scharf, Stuttgart (DE)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 167 days.

(21) Appl. No.: 14/484,688

(22) Filed: Sep. 12, 2014

(65) Prior Publication Data

US 2016/0080202 A1    Mar. 17, 2016

(51) Int. Cl.
*G06F 15/173*    (2006.01)
*H04L 12/24*    (2006.01)

(52) U.S. Cl.
CPC .......... *H04L 41/12* (2013.01); *H04L 41/0813* (2013.01); *H04L 41/0893* (2013.01); *H04L 41/147* (2013.01)

(58) Field of Classification Search
CPC .................................................. H04L 41/0813
See application file for complete search history.

(56) References Cited

U.S. PATENT DOCUMENTS 6,456,600 B1 *   9/2002   Rochberger ............ H04L 45/02
                                                 370/238.1
8,082,337 B1    12/2011   Davis et al.
(Continued)

FOREIGN PATENT DOCUMENTS

EP    2 461 547    6/2012
EP    2629454    8/2013
(Continued)

OTHER PUBLICATIONS

Hui J. and Yiwen Wu: Mar. 21-23, 2004; Scalable ad-hoc network routing based on the distance-matrix shortest path routing.*
(Continued)

*Primary Examiner* — Richard G Keehn
(74) *Attorney, Agent, or Firm* — Tong, Rea, Bentley & Kim, LLC (57) ABSTRACT

A capability for sparsifying a representation of pairwise cost information is presented herein. The capability for sparsifying a representation of pairwise cost information may be used to sparsify a representation of pairwise cost information for a set of nodes. The sparsification of a representation of pairwise cost information for a set of nodes may provide thereby a sparsified representation of the pairwise cost information for the set of nodes. The sparsification of the representation of pairwise cost information for the set of nodes may be based on clustering of the nodes of the set of nodes into clusters. The sparsification of the representation of pairwise cost information for the set of nodes may be based on calculation of intra-cluster costs and inter-cluster costs, where the intra-cluster costs and inter-cluster costs are calculated based on the pairwise cost information of the representation of the pairwise cost information for the set of nodes.

9 Claims, 7 Drawing Sheets

(56) References Cited

U.S. PATENT DOCUMENTS

| | | |
|---|---|---|
| 2004/0215978 A1 | 10/2004 | Okajo |
| 2007/0263544 A1* | 11/2007 | Yamanaka ............... H04L 45/12 370/238 |
| 2009/0125620 A1* | 5/2009 | Klincewicz ........... H04L 41/048 709/223 |
| 2015/0207703 A1 | 7/2015 | Gallagher |

FOREIGN PATENT DOCUMENTS

| | | |
|---|---|---|
| EP | 2760160 | 7/2014 |
| WO | WO 2013/066602 | 5/2013 |

OTHER PUBLICATIONS

Erciyes G. and Marshall G.: 2004; A cluster based hierarchical routing protocol for Mobile networks; Computational Sccience and its Applications—ICCSA 2004, vol. 3045, pp. 528-537.*

Rai P.; Oct. 4, 2011; Data Clustering: K-means and hierarchical clustering.*

Hui J. and Yiwen Wu: Globecom 2003; Scalable ad-hoc network routing based on the distance-matrix shortest path routing.*

Scharf et al., "ATLAS: Accurate Topology Level-of-Detail Abstraction System," Network Operations and Management Symposium (NOMS), Krakow, Poland, May 5-9, 2014, pp. 1-5.

Scharf et al., "Dynamic VPN Optimization by ALTO Guidance," 2013 Second European Workshop on Software Defined Networks (EWSDN), Berlin, Germany, Oct. 10-11, 2013, pp. 1-6.

Scharf et al., "Sparsifying Network Topologies for Application Guidance," IFIP/IEEE International Symposium on Integrated Network Management, Ottawa, Canada, May 11-15, 2015, pp. 1-9.

7750 Service Router, Alcatel-Lucent, www.alcatel-lucent.com/products/7750-service-router, downloaded Apr. 23, 2015, pp. 1-2.

King et al., "A PCE-based Architecture for Applications-based Network Operations," Internet Engineering Task Force, Oct. 21, 2013, pp. 1-96.

Medved et al., "An Information Model for Network Topologies," Network Working Group, Jul. 15, 2013, pp. 1-16.

Stiemerling et al., "ALTO Deployment Considerations," ALTO Internet Draft, Version 9, Feb. 11, 2014, pp. 1-52.

Seedorf et al., "Application-Layer Traffic Optimization (ALTO) Problem Statement," Network Working Group, RFC 5693, Oct. 2009, pp. 1-14.

Davidson et al., "Clustering With Constraints Web Site," http://web.cs.ucdavis.edu/~davidson/constrained-clustering/, printed on Jun. 3, 2015.

International Search Report and Written Opinion of PCT/US2015/011962, dated Apr. 30, 2015, pp. 1-13.

Stiemerling et al., "ALTO Deployment Considerations," ALTO Internet Draft, Version 10, Jul. 3, 2014, pp. 1-55.

* cited by examiner

SPARSIFICATION OF PAIRWISE COST INFORMATION

TECHNICAL FIELD

The disclosure relates generally to communication networks and, more specifically but not exclusively, to representation of network topology information of communication networks.

BACKGROUND

In general, network topology information for a network may be used for various purposes, such as managing the network, managing services that are offered via the network, controlling operation of network-aware applications that are provided via the network (e.g., content delivery networks (CDNs), cloud computing solutions, or other applications that typically require insight into the underlying network topology), and so forth. Various applications may make use of network topology information for such purposes; however, in many cases, it may be necessary or desirable to make only a portion of the available network topology information available to the application. For example, the network operator of the network may have an interest in preventing certain portions of the topology information from being made available to the applications (e.g., to protect proprietary information, for security purposes, or the like), the applications may require only certain portions of the available network topology information, or the amount of available network topology information may simply be too large (e.g., to be handled by clients of the application, to be useful to users of the application, or the like). Accordingly, various network topology exposure capabilities have been developed for use in controlling the portions of the network topology of a network that are exposed to applications. In many cases, network topology exposure capabilities may control portions of the network topology that are exposed to applications by abstracting portions of the network topology information in a manner that preserves relevant portions of the network topology information while also eliminating portions of the network topology information that it may be necessary or desirable to remove. An example of one such widely used network topology exposure capability is the Application-Layer Traffic Optimization (ALTO) protocol developed by the Internet Engineering Task Force (IETF). For example, a network operator can provide one or more ALTO servers having one or more views of the network which may be exposed to ALTO clients of applications. The ALTO servers may support various services, such as providing one or more network maps, one or more cost maps, one or more ranking services, and so forth. Disadvantageously, however, existing versions of the ALTO protocol as well as other network topology exposure capabilities still require storage of significant amounts of network topology information for at least some networks.

SUMMARY OF EMBODIMENTS

Various deficiencies in the prior art may be addressed by embodiments for sparsifying pairwise cost information to provide sparsified pairwise cost information.

In at least some embodiments, an apparatus is configured to receive a representation of pairwise cost information for a set of nodes and sparsify the representation of pairwise cost information for the set of nodes to form a sparsified representation of the pairwise cost information for the set of nodes.

In at least some embodiments, a method includes receiving, via a processor, a representation of pairwise cost information for a set of nodes, and sparsifying the representation of the pairwise cost information for the set of nodes to form a sparsified representation of the pairwise cost information for the set of nodes.

In at least some embodiments, a non-transitory computer-readable storage medium stores instructions which, when executed by a computer, cause the computer to perform a method, the method including receiving a representation of pairwise cost information for a set of nodes, and sparsifying the representation of the pairwise cost information for the set of nodes to form a sparsified representation of the pairwise cost information for the set of nodes.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a capability for sparsifying pairwise information is presented herein. The capability for sparsifying pairwise information may be configured to sparsify pairwise cost information in order to produce sparsified pairwise cost information. The capability for sparsifying pairwise cost information in order to produce sparsified pairwise cost information may be configured to sparsify a representation of pairwise cost information to produce a sparsified representation of pairwise cost information. The capability for sparsifying a representation of pairwise cost information may be used to sparsify a representation of pairwise cost information for a set of nodes (e.g., a collection of nodes, such as nodes of a communication network or any other suitable collection of nodes). The sparsification of a representation of pairwise cost information for a set of nodes may produce thereby a sparsified representation of the pairwise cost information for the set of nodes. The sparsification of the representation of pairwise cost information for the set of nodes to produce the sparsified representation of the pairwise cost information for the set of nodes may be based on clustering of the nodes of the set of nodes into clusters. The sparsification of the representation of pairwise cost information for the set of nodes to produce the sparsified representation of the pairwise cost information for the set of nodes may include clustering the nodes into clusters, performing cost calculations based on the clustering of the nodes into the clusters, and determining the sparsified representation of the pairwise cost information for the set of nodes based on the cost calculations. The sparsification of the representation of pairwise cost information for the set of nodes to produce the sparsified representation of the pairwise cost information for the set of nodes may be based on calculation of intra-cluster costs and inter-cluster costs based on the pairwise cost information of the representation of the pairwise cost information for the set of nodes. The sparsification of the representation of pairwise cost information for the set of nodes to produce the sparsified representation of the pairwise cost information for the set of nodes may be based on any suitable measure of pairwise costs between pairs of nodes of the set of nodes (e.g., distance along paths between pairs of nodes, failure probability along paths between pairs of nodes, or the like, as well as various combinations thereof). The sparsification of a representation of pairwise cost information for a set of nodes may be performed within the context of matrix-based representations of pairwise cost information (e.g., sparsifying a matrix representation of pairwise cost information for a set of nodes to produce a sparsified matrix representation of pairwise cost information for the set of nodes), although it will be appreciated that pairwise cost information for a set of nodes may be represented using other types of representations. The sparsification of a representation of pairwise cost information for a set of nodes may be performed without sparsifying a corresponding representation of the set of nodes (e.g., without sparsifying a network representation of the nodes, without sparsifying a graph representation of the nodes, or the like), thereby enabling the pairwise cost information between pairs of the nodes of the set of nodes to be preserved more accurately than when the corresponding representation of the set of nodes is sparsified prior to the computation of the representation of the pairwise cost information. As primarily presented herein, the capability for sparsifying a matrix representation of information may be provided within the context of a network topology exposure system (e.g., for exposing network topology information to clients using Application-Layer Traffic Optimization (ALTO) or any other suitable network topology exposure capability), although it will be appreciated that the capability for sparsifying a matrix representation of information may be provided within various other types of systems or environments. These and various other embodiments and advantages of the capability for sparsifying a representation of pairwise information may be further understood when considered within the context of an exemplary topology exposure system, as depicted in FIG. 1.

Figure 1:
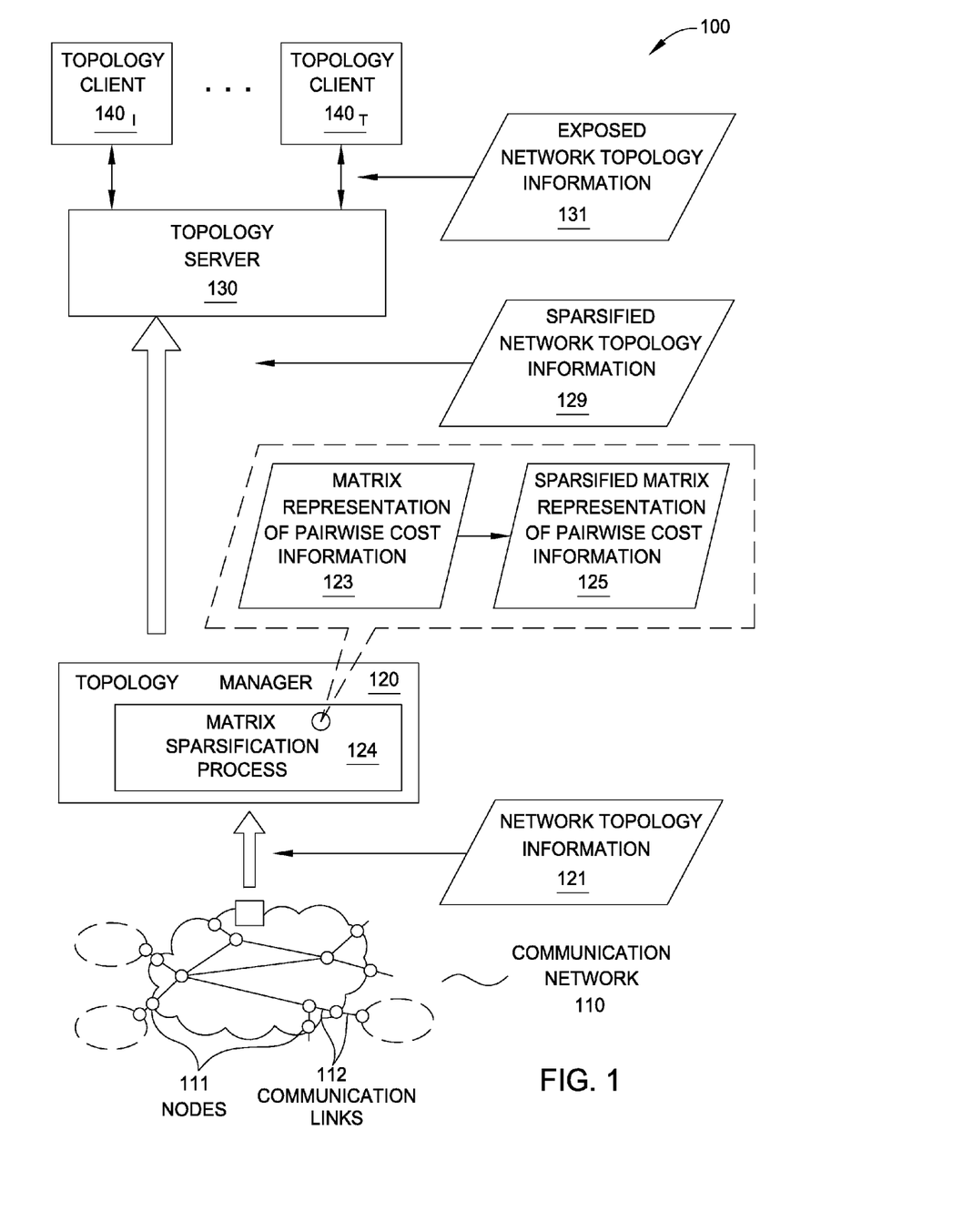
FIG. 1 depicts an exemplary topology exposure system configured to sparsify network topology information of a communication network for which network topology information is to be exposed.

FIG. 1 depicts an exemplary topology exposure system configured to sparsify network topology information of a communication network for which network topology information is to be exposed.

The topology exposure system 100 includes a communication network 110, a topology manager 120, a topology server 130, and a set of topology clients $140_1$-$140_T$ (collectively, topology clients 140).

The communication network 110 is a network for which network topology management is performed. The communication network 110 may include various nodes 111 (e.g., switches, routers, access nodes, control elements, end user devices, or the like) and communication links 112. The interconnection of the nodes 111 via the communication links 112 forms a network topology of the communication network 110.

The topology manager 120 is configured to perform network topology management functions for communication network 110.

The topology manger 120 may be configured to obtain network topology information 121 that describes the network topology of communication network 110. The topology manager 120 may receive network topology information 121 from nodes 111 of the communication network 110 (e.g., via reporting from nodes 111, by querying nodes 111, or the like), from one or more management systems configured to perform management functions for the communication network 110 (e.g., one or more Element Management Systems (EMSs), a Network Management System (NMS), or the like), by passively monitoring routing protocol messages, or the like, as well as various combinations thereof.

The topology manager 120 may be configured to generate representations of network topology information 121. The topology manager 120 may represent network topology information 121 in various ways. For example, topology manager 120 may represent various portions of the network topology information 121 using one or more graph-based representations of network topology information 121, using one or more matrix-based representation of network topology information 121, or the like, as well as various combinations thereof. The topology manager 120 may generate representations of the network topology information 121 (e.g., graphs, matrices, or the like) based on processing of the network topology information 121 received by topology manager 120. The topology manager 120 may generate a matrix representation of pairwise cost information 123 between pairs of nodes 111 of the communication network 110. The matrix representation of pairwise cost information 123 between pairs of nodes 111 of the communication network 110 may be generated from the network topology information 121 directly, based on a representation of network topology information 121 (e.g., a graph-based representation of network topology information 121), or the like, as well as various combinations thereof. The matrix representation of pairwise cost information 123 between pairs of nodes 111 of the communication network 110 may include an N×N matrix, wherein N is the number of nodes 111 of the communication network 110 (or portion of communication network 110 for which the matrix representation of pairwise cost information 123 is generated), such that the matrix representation of pairwise cost information 123 between pairs of nodes 111 of the communication network 110 includes, for each pair of nodes 111, a value of the pairwise cost between the two nodes 111 of the pair of nodes 111. The matrix representation of pairwise cost information 123 between pairs of nodes 111 of the communication network 110 may be based on any suitable measure of cost between pairs of the nodes 111 of the communication network 110 (e.g., distance along paths between pairs of nodes 111, failure probability along paths between pairs of nodes 111, or the like, as well as various combinations thereof). It is noted that the pairwise cost between a pair of nodes 111 may be an additive measure of cost between the pair of nodes 111 where there are multiple hops between the nodes 111 (e.g., where the minimum cost path between the nodes 111 traverses one or more other nodes 111 not included in the pair of nodes 111), which may be determined in different ways for different cost measures. For example, where cost is based on distance, the distance between the pair of nodes 111 may be determined by adding the distances of each of the hops along the path between the pair of nodes 111. For example, where cost is based on failure probability, the failure probability of the path between the pair of nodes 111 may be determined by taking the logarithm of each failure probability of each of the hops along the path between the pair of nodes 111 and adding those values to determine the failure probability of the path between the pair of nodes 111. It will be appreciated that additive costs for a pair of nodes 111 may be determined in other ways for other types of cost measures. The matrix representation of pairwise cost information 123 between pairs of nodes 111 of the communication network 110 may represent minimum costs between the pairs of nodes 111 of the communication network 110 (e.g., where there may be multiple paths between pairs of nodes 111 due to the arrangement of the topology of the nodes 111).

The topology manager 120 may be configured to perform network topology abstraction functions for controlling abstraction of the network topology information 121 and, thus, for controlling portions of the network topology information 121 that are exposed via topology server 130 to the topology clients 140. The topology manager 120 is configured to perform sparsification of the network topology information 121 for communication network 110 to provide sparsified network topology information 129 for the communication network 110 (which may be provided to topology server 130 for use by topology server 130 in serving requests from topology clients 140). The topology manager 120 may sparsify the network topology information 121 for communication network 110 by sparsifying the matrix representation of pairwise cost information 123 between pairs of nodes 111 of the communication network 110 to form a sparsified matrix representation of pairwise cost information 125 between pairs of nodes 111 of the communication network 110. The sparsified matrix representation of pairwise cost information 125 between pairs of nodes 111 of the communication network 110, like the matrix representation of pairwise cost information 123 between pairs of nodes 111 of the communication network 110, may be based on any suitable measure of cost between the nodes 111 of the communication network 110 (e.g., distance between pairs of nodes 111, failure probability along paths between pairs of nodes 111, or the like, as well as various combinations thereof). It is noted that, as discussed above with respect to the matrix representation of pairwise cost information 123 between pairs of nodes 111 of the communication network 110, the sparsified matrix representation of pairwise cost information 125 between pairs of nodes 111 of the communication network 110 may include additive measures of cost (again, which may be determined in different ways for different cost measures). The sparsified matrix representation of pairwise cost information 125 between pairs of nodes 111 of the communication network 110 may be a k×k matrix where k<N. The topology manager 120 may generate the sparsified matrix representation of pairwise cost information 125 between pairs of nodes 111 of the communication network 110 from the matrix representation of pairwise cost information 123 between pairs of nodes 111 of the communication network 110 based on clustering of the nodes 111 of the communication network 110 (e.g., based on clustering of N nodes into k clusters so as to convert the N×N matrix of pairwise cost information into a k×k matrix of pairwise cost information that may be used as an approximation of the pairwise cost information of the N×N matrix, as discussed further below). The topology manager 120 may generate the sparsified matrix representation of pairwise cost information 125 between pairs of nodes 111 of the communication network 110 from the matrix representation of pairwise cost information 123 between pairs of nodes 111 of the communication network 110 based on a matrix sparsification process 124 which may be executed by topology manager 120 (e.g., stored in a memory of topology manager 120 and executed by a processor of topology manager 120, which have been omitted from FIG. 1 for purposes of clarity). The sparsification of the matrix representation of pairwise cost information 123 between pairs of nodes 111 of the communication network 110 may be performed without sparsifying a corresponding representation of the nodes 111 of communication network 110 (e.g., without sparsifying a network representation of the nodes 111, without sparsifying a graph representation of the nodes 111, or the like), thereby enabling the pairwise cost information between pairs of nodes 111 of communication network 110 to be preserved more accurately than when the corresponding representation of the nodes 111 of communication network 110 is sparsified prior to the computation of the matrix representation of pairwise cost information 123 between pairs of nodes 111 of the communication network 110.

The topology manager 120 may be configured to provide the sparsified network topology information 129 for communication network 110 to the topology server 130 for use by topology server 130 in serving requests from topology clients 140). The sparsified network topology information 129 may include portions of network topology information 121 received by topology manager 120, representations of network topology information 121 generated by topology manager (e.g., one or more network graphs, one or more matrices (e.g., the sparsified matrix representation of pairwise cost information 125 between pairs of nodes 111 of the communication network 110), or the like, as well as various combinations thereof).

The topology manager 120 may be configured to perform various other topology management functions.

The topology server 130 is configured to manage exposure of the sparsified network topology information 129 to the topology clients 140 where portions of the sparsified network topology information 129 that are exposed to topology clients 140 are denoted as exposed network topology information 131. The topology server 130 is configured to receive sparsified network topology information 129 from topology manager 120 and to store sparsified network topology information 129 for use in responding to requests from the topology clients 140. The topology server 130 is configured to receive requests from topology clients 140 and to respond to requests from topology clients 140 based on the sparsified network topology information 129. The topology server 130 may support various types of services which may support exposure of various types of information at various granularities. For example, topology server 130 may support network maps, cost maps, ranking services, or the like, as well as various combinations thereof. The topology server 130 may support at least some of these services based on the sparsified matrix representation of pairwise cost information 125 between pairs of nodes 111 of the communication network 110 that is received from topology manager 120 as part of the sparsified network topology information 129. For example, topology server 130 may be configured to provide network maps and cost maps based on the sparsified matrix representation of pairwise cost information 125 between pairs of nodes 111 of the communication network 110 that is received from topology manager 120. The topology manager 130 may be configured to use the sparsified network topology information 129 in order to approximate costs between nodes 111 of communication network 110 (e.g., the pairwise cost between a first cluster c1 and a second cluster c2 (where c1 and c2 may be the same cluster) may be used as an approximation of the actual pairwise cost between a node x in the first cluster c1 and a node y in the second cluster c2). The topology manager 130 may be configured to control exposure of the sparsified network topology information 129 to topology clients 140 based on topology exposure policies (e.g., one or more policies of the network operator of communication network 110, one or more policies of an application with which topology clients 140 are associated, or the like, as well as various combinations thereof). The topology server 130 may be configured to provide various other functions for controlling exposure of the sparsified network topology information 129 to the topology clients 140.

The topology clients 140 may include any clients which may access sparsified network topology information 129 from topology server 130. The topology clients 140 may send requests for topology information to topology server 130, receive topology information from topology server 130, and present the topology information via one or more presentation interfaces of the topology clients 140. The topology clients 140 may request various types of topology information which may be presented at topology clients 140 in various ways. The topology clients 140 may be running on any suitable devices (e.g., operations center workstations, desktop computers, laptop computers, tablet computers, smartphones, or the like). The topology clients 140 may be associated with a particular application, and exposure of network topology information of communication network 110 to topology clients 140 may be based on the application with which the topology clients 140 are associated. The typical manner in which topology clients 140 may access sparsified network topology information 129 from topology server 130 will be understood by one skilled in the art.

The topology exposure system 100, as discussed above, may be based on ALTO or any other suitable network topology exposure capability. In the case of ALTO, for example, topology server 130 may be an ALTO server and topology clients 140 may be ALTO clients, where the ALTO server and the ALTO clients communicate using the ALTO protocol. As discussed above, an ALTO server can support various services. For example, ALTO may define a network map that partitions the network into a set of groups referred to as PIDs, and may define a cost map that encodes costs between the PIDs from the perspective of the ALTO server. As also discussed above, topology manager 120 is configured to sparsify a matrix representation of cost pairwise information between pairs of nodes to form a sparsified matrix representation of pairwise cost information between pairs of nodes, which may be used within the context of ALTO-based capabilities which may be supported by the ALTO server and the ALTO clients. For example, where the matrix representation is a complete distance matrix for communication network 110 and the sparsified matrix representation is a sparsified distance matrix for communication network 110, the sparsified distance matrix for communication network may be used to represent the ALTO network and cost maps for communication network 110. It will be appreciated that the topology exposure system 100 may be based on any other suitable network topology exposure capability.

Figure 2:
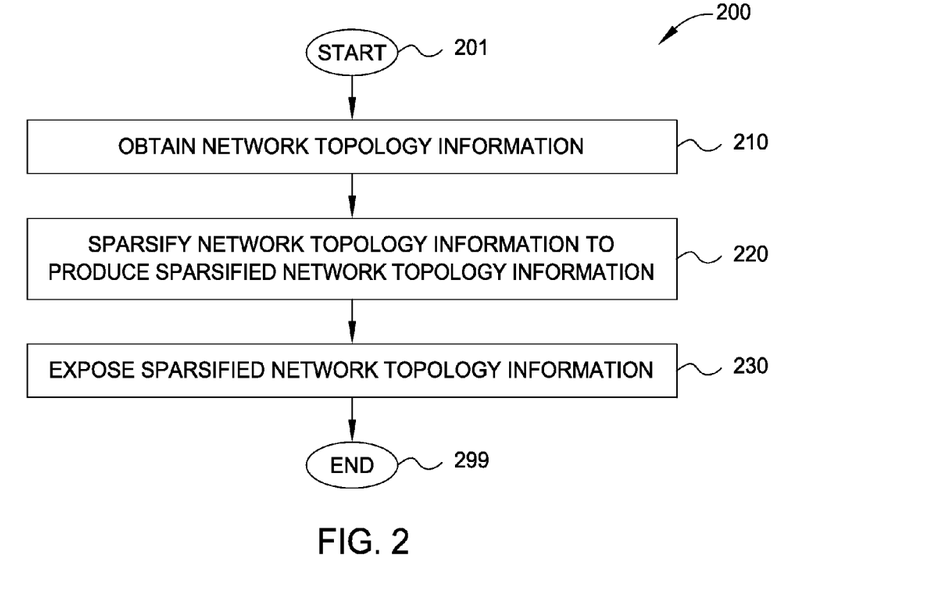
FIG. 2 depicts an exemplary embodiment of a method for exposing network topology information to an application.

FIG. 2 depicts an exemplary embodiment of a method for exposing network topology information to an application. It will be appreciated that, although primarily presented as being performed serially, at least a portion of the steps of method 200 may be performed contemporaneously or in a different order than as presented in FIG. 2.

At step 201, method 200 begins.

At step 210, network topology information indicative of a network topology of a network is obtained. The network topology information may include a network graph representation of network topology information or information indicative of a network graph representation of network topology information. The network topology information may include a matrix representation of network topology information of the network or may be indicative of a matrix representation of network topology information of the network. The matrix representation of the network topology information may be a matrix representation of pairwise cost information between pairs of nodes of the network. The matrix representation of pairwise cost information between pairs of nodes of the network may be based on a cost measure. The cost measure may be a distance measure indicative of a communication distance of a communication path between a pair of nodes of the network (e.g., a shortest path measure in terms of number of hops or other suitable measures of distance), a failure probability measure indicative of a probability of a failure along a communication path between a pair of nodes of the network, a latency measure indicative of an expected latency for a communication path between a pair of nodes of the network, or the like, as well as various combinations thereof.

At step 220, the network topology information of the network is sparsified to produce sparsified network topology information of the network. The network topology information of the network may be sparsified by sparsifying the matrix representation of the network topology information to form a sparsified matrix representation of the network topology information. The matrix representation of the network topology information may be a matrix representation of pairwise cost information between pairs of nodes of the network and, thus, the sparsified matrix representation of the network topology information may be a sparsified matrix representation of the pairwise cost information between pairs of nodes of the network. The sparsified matrix representation of the pairwise cost information between pairs of nodes of the network, like the matrix representation of the pairwise cost information between pairs of nodes of the network, may be based on a cost measure (e.g., a distance measure, a failure probability measure, a latency measure, or the like). The sparsification of the matrix representation of pairwise cost information between pairs of nodes of the network to form the sparsified matrix representation of the network topology information may be based on one or more of a target size of the sparsified matrix representation of the pairwise cost information between pairs of nodes of the network, one or more sparsification policies, or the like, as well as various combinations thereof. The sparsification of the matrix representation of the pairwise cost information between pairs of nodes of the network to produce the sparsified matrix representation of the pairwise cost information between pairs of nodes of the network may be performed as depicted and described with respect to FIG. 3.

At step 230, the sparsified network topology information of the network is exposed. The sparsified network topology information of the network may be exposed to an application. The sparsified network topology information of the network may be exposed to the application in various ways. For example, the sparsified network topology information may be provided to a server which may then respond to requests from application clients of the application. For example, the sparsified network topology information may be provided to application clients of the application responsive to requests from application clients of the application. The sparsified network topology information may be exposed based on one or more exposure policies (e.g., one or more policies by which the network operator may control the type of network topology information that is exposed, one or more policies specific to the application for which the sparsified network topology is exposed, or the like, as well as various combinations thereof). The exposure of the sparsified network topology information may include generation of one or more network graphs which may be displayed via application clients of the application. The exposure of the sparsified network topology information may include generation of one or more maps which may be displayed via application clients of the application (e.g., a network map, a cost map, or the like, as well as various combinations thereof). The exposure of the sparsified network topology information may include exposure of information computed or generated based on the sparsified matrix representation of the network topology information (e.g., a network map generated based on a sparsified distance matrix, a cost map generated based on a sparsified distance matrix, a cost map generated based on a sparsified failure probability matrix, or the like, as well as various combinations thereof).

At step 299, method 200 ends.

Figure 3:
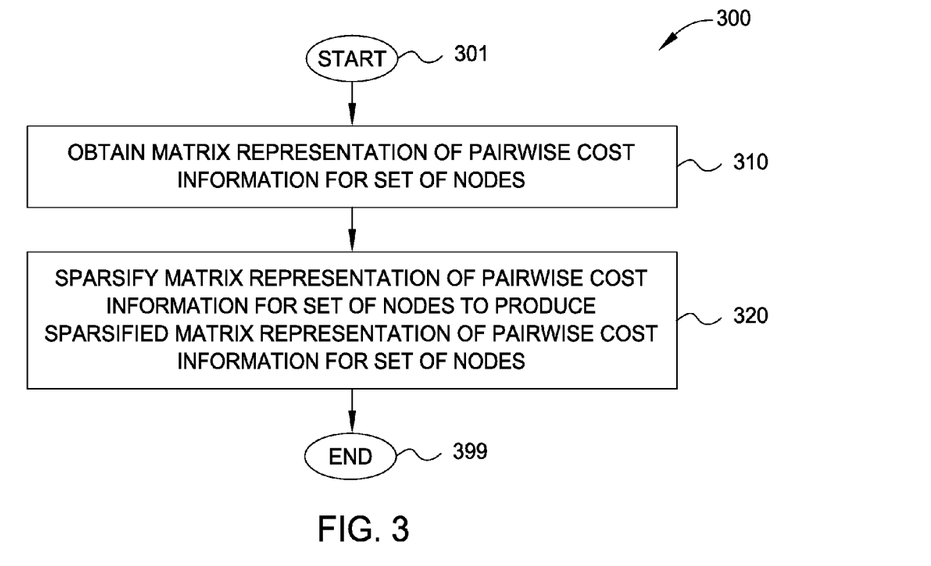
FIG. 3 depicts an exemplary embodiment of a method for sparsifying a matrix representation of pairwise cost information for a set of nodes.

FIG. 3 depicts an exemplary embodiment of a method for sparsifying a matrix representation of pairwise cost information for a set of nodes. It will be appreciated that, although primarily presented as being performed serially, at least a portion of the steps of method 300 may be performed contemporaneously or in a different order than as presented in FIG. 3.

At step 301, method 300 begins.

At step 310, a matrix representation of pairwise cost information for a set of nodes is obtained. The matrix representation of pairwise cost information for the set of nodes may be received, generated based on a graph representation of the pairwise cost information for the set of nodes, or the like. The matrix representation of pairwise cost information for the set of nodes may be based on a cost measure (e.g., distance, failure probability, latency, or the like). The matrix representation of the pairwise cost information for the set of nodes may be a matrix of pairwise costs between pairs of nodes of the set of nodes (e.g., an N×N matrix wherein N is the number of nodes in the set of nodes). The structure of the matrix representation of the pairwise cost information for the set of nodes may be further understood by way of reference to the example of FIG. 7.

At step 320, the matrix representation of the pairwise cost information for the set of nodes is sparsified to produce a sparsified matrix representation of the pairwise cost information for the set of nodes. The sparsified matrix representation of the pairwise cost information for the set of nodes may be based on the same cost measure of the matrix representation of the pairwise cost information for the set of nodes. The sparsified matrix representation of the pairwise cost information for the set of nodes may be a k×k matrix, where k<N. The sparsification of the matrix representation of the pairwise cost information for the set of nodes to produce the sparsified matrix representation of the pairwise cost information for the set of nodes may be performed as depicted and described with respect to FIG. 4. The structure of the sparsified matrix representation of the pairwise cost information for the set of nodes may be further understood by way of reference to the example of FIG. 7.

At step 399, method 300 ends.

Figure 4:
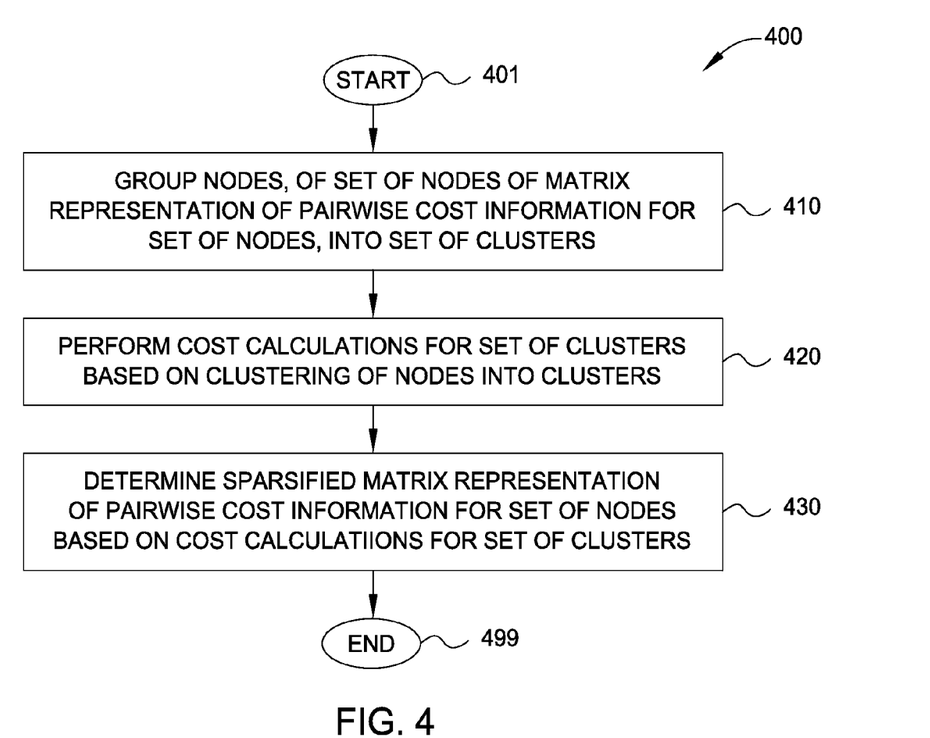
FIG. 4 depicts an exemplary embodiment of a method for sparsifying a matrix representation of pairwise cost information for a set of nodes based on clustering of the nodes and cost calculations based on the clustering of the nodes.

FIG. 4 depicts an exemplary embodiment of a method for sparsifying a matrix representation of pairwise cost information for a set of nodes based on clustering of the nodes and cost calculations based on the clustering of the nodes. It will be appreciated that, although primarily presented as being performed serially, at least a portion of the steps of method 400 may be performed contemporaneously or in a different order than as presented in FIG. 4.

At step 401, method 400 begins.

At step 410, nodes of a set of nodes are grouped into clusters. The set of nodes include nodes of a matrix representation of pairwise cost information for the set of nodes. The set of nodes includes N nodes and the matrix representation of the pairwise cost information for the set of nodes is an N×N matrix. The clusters form a set of clusters. The set of clusters includes k clusters, wherein N>k. The nodes of the matrix representation of the pairwise cost information for the set of nodes may be grouped into the clusters randomly, based on a clustering algorithm, or the like. The nodes of the matrix representation of the pairwise cost information may be grouped into the clusters based on information included in the matrix representation of the pairwise cost information for the set of nodes (e.g., distances between nodes as specified in the matrix representation of pairwise cost information, other types of costs between nodes as specified in the matrix representation of pairwise cost information, or the like). The nodes of the matrix representation of the pairwise cost information for the set of nodes may be grouped into the clusters using a k-center clustering process as depicted and described with respect to FIG. 5.

At step 420, cost calculations are performed for the set of clusters based on clustering of the nodes into the clusters. The cost calculations may be performed based on the pairwise cost values from the matrix representation of the pairwise cost information for the set of nodes, which, as discussed above, indicates pairwise costs between respective pairs of nodes of the set of nodes. The cost calculations may include intra-cluster cost calculations and inter-cluster cost calculations. The cost calculations based on clustering of the nodes into clusters may be performed as depicted and described with respect to FIG. 6.

At step 430, the sparsified matrix representation of the pairwise cost information for the set of nodes is determined based on the cost calculations for the set of clusters. The sparsified matrix representation of the pairwise cost information for the set of nodes is a k×k matrix where, as discussed above, k is the number of clusters. As noted above, the structure of the sparsified matrix representation of the pairwise cost information for the set of nodes may be further understood by way of reference to the example of FIG. 7.

At step 499, method 400 ends.

Figure 5:
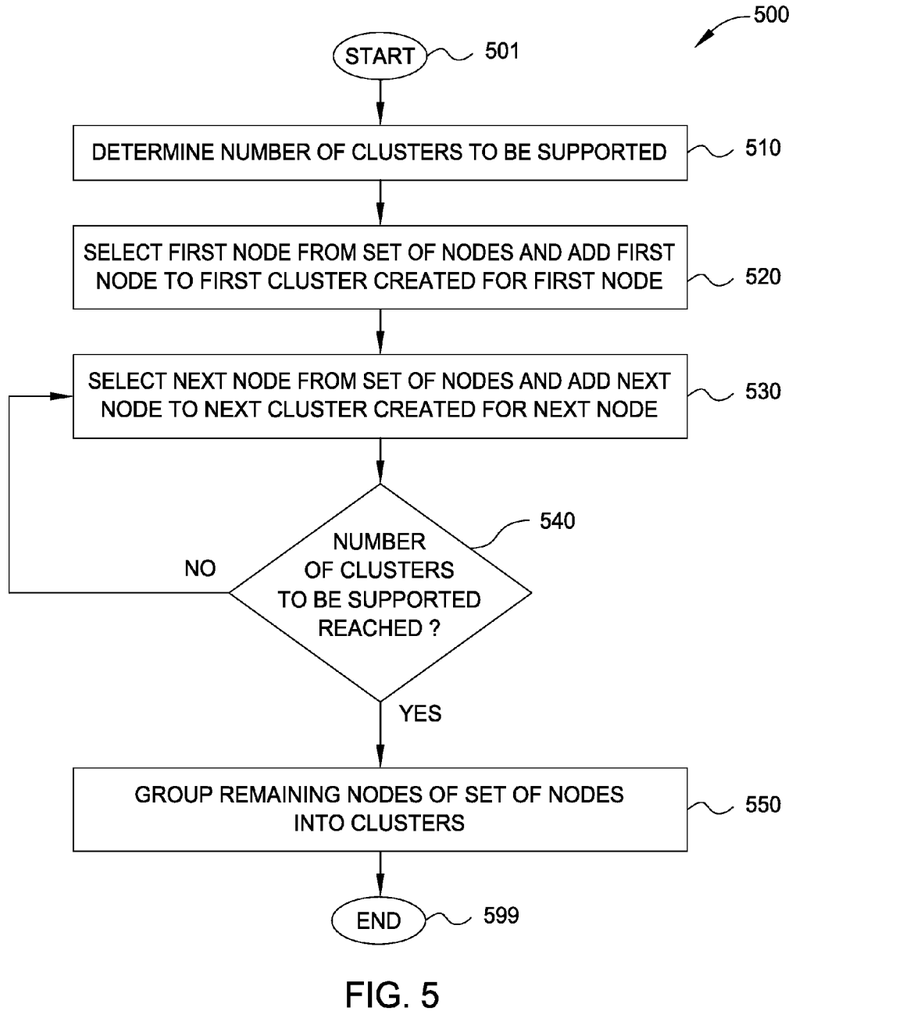
FIG. 5 depicts an exemplary embodiment of a method for clustering of nodes of a set of nodes for use in sparsifying a matrix representation of pairwise cost information for the set of nodes.

FIG. 5 depicts an exemplary embodiment of a method for clustering of nodes of a set of nodes for use in sparsifying a matrix representation of pairwise cost information for the set of nodes. The nodes in the set of nodes are clustered to form a set of clusters, where the set of nodes includes N nodes and the set of clusters includes k clusters (N>k). It will be appreciated that, although primarily presented as being performed serially, at least a portion of the steps of method 500 may be performed contemporaneously or in a different order than as presented in FIG. 5.

At step 501, method 500 begins.

At step 510, a number of clusters (k) to be supported is determined. The number of cluster is at least equal to two, but is less than the number of nodes (N) in the set of nodes.

At step 520, a first node is selected from the set of nodes and added to a first cluster created for the first node.

At step 530, a next node is selected from the set of nodes and added to a next cluster created for the next node. The next node that is selected cannot be a node that has already been selected from the set of nodes (i.e., a node that is already part of a previously created cluster(s)). The next node is selected in a manner for maximizing a distance between the next node and the previously selected node(s).

At step 540, a determination is made as to whether the number of clusters to be supported has been reached. If a determination is made that the number of clusters to be supported has not been reached, the method 500 returns to step 530. If a determination is made that the number of clusters to be supported has been reached, the method 500 proceeds to step 550.

At step 550, remaining nodes of the set of nodes are grouped into the clusters. The remaining nodes of the set of nodes may be grouped into the clusters based on distance (e.g., for each of the remaining nodes in the set of nodes, based on distances between the remaining node and each of the clusters into which the remaining node could be grouped). The remaining nodes of the set of nodes may be grouped into the clusters by, for each of the remaining nodes in the set of nodes, determining a closest cluster for the remaining node and adding the remaining node to the closest cluster for the remaining node. As a result, each of the clusters includes at least one node and each of the nodes belongs to one of the clusters.

At step 599, method 500 ends.

Figure 6:
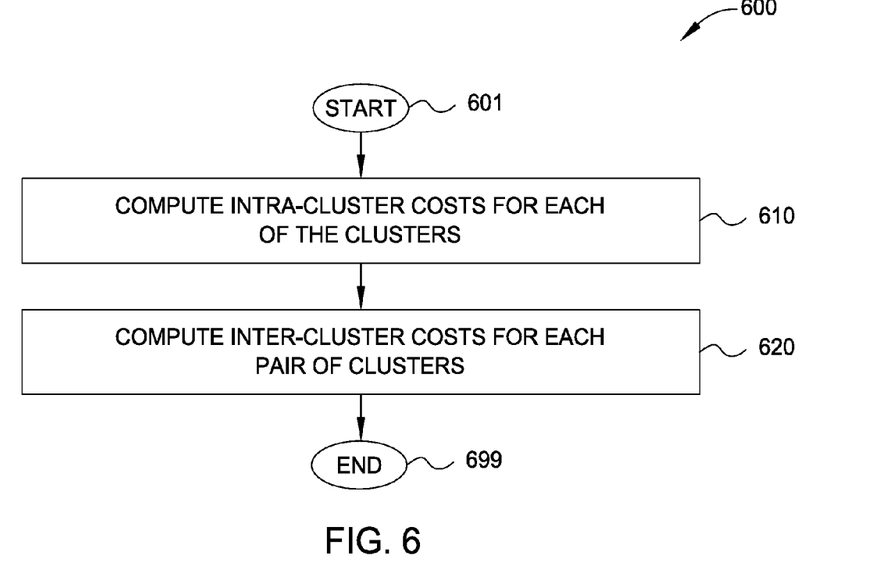
FIG. 6 depicts an exemplary embodiment of a method for performing cost calculations for use in sparsifying a matrix representation of pairwise cost information for a set of nodes.

FIG. 6 depicts an exemplary embodiment of a method for performing cost calculations for use in sparsifying a matrix representation of pairwise cost information for a set of nodes. It will be appreciated that, although primarily presented as being performed serially, at least a portion of the steps of method 600 may be performed contemporaneously or in a different order than as presented in FIG. 6.

At step 601, method 600 begins.

At step 610, intra-cluster costs are computed for each of the clusters. The intra-cluster cost for a cluster may be computed as an average cost between pairs of nodes of the cluster. The average cost between pairs of nodes of the cluster may be computed by computing pairwise costs between respective pairs of nodes of the cluster, summing the pairwise costs to determine a total cost for the cluster, and dividing the total cost for the cluster by the number of pairs of nodes of the cluster. For example, where the cost measure of the matrix representation is a shortest path distance, the average cost may be the average shortest path distance between the nodes of the cluster. For example, where the cost measure of the matrix representation is a path failure probability, the average cost may be the average path failure probability for communication paths between the nodes of the cluster. For example, where a cluster includes four nodes (n1, n2, n3, and n4), the intra-cluster cost for the cluster may be computed as [(cost between n1 and n2)+(cost between n1 and n3)+(cost between n1 and n4)+(cost between n2 and n3)+(cost between n2 and n4)+(cost between n3 and n4)/6]. It is noted that, although primarily described with respect to examples in which the pairwise cost between two nodes is the same in both directions, there may be cases in which the pairwise cost between two nodes is different in different directions, in which case both costs may be considered in computer intra-cluster distance (e.g., where a cluster includes three nodes (n1, n2, and n3) and costs between the nodes may be different in different directions, the intra-cluster cost for the cluster may be computed as [(cost from n1 to n2)+(cost from n2 to n1)+(cost from n1 to n3)+(cost from n3 to n1)+(cost from n2 to n3)+(cost from n3 to n2)/6]). It will be appreciated from the foregoing examples that, more generally, if there are x nodes included within a given cluster, there are $x(x-1)/2$ pairs of node pair costs to average over if costs are symmetric in both directions between the nodes and that there are $x(x-1)$ pairs of node pair costs to average over if costs are asymmetric between the nodes based on direction. It is further noted that, although primarily described with respect to examples in which it is assumed that there is only a single communication path (and, thus, a single cost) between a first node in the pair of nodes and a second node in the pair of nodes, there may be cases in which there are multiple communication paths (and, thus, multiple costs) between a first node in the pair of nodes and a second node in the pair of nodes and these cases may be handled in various ways (e.g., selecting the minimum cost for use in computing intra-cluster cost, computing an average cost for use in computing the intra-cluster cost, or the like). The manner in which intra-cluster costs may be computed may be further understood by way of reference to the example of FIG. 7.

At step 620, inter-cluster costs are computed for each pair of clusters. The inter-cluster cost for a pair of clusters may be computed as an average cost between pairs of nodes of the clusters in the pair of clusters. The average cost between pairs of nodes of the clusters in the pair of clusters may be computed by computing pairwise costs between respective pairs of nodes of the clusters in the pair of clusters, summing the pairwise costs to determine a total cost for the pair of clusters, and dividing the total cost for the pair of clusters by the number of pairs of nodes of the clusters in the pair of clusters. For example, where the cost measure of the matrix representation is a shortest path distance, the average cost may be the average shortest path distance between the pairs of nodes of the clusters in the pair of clusters. For example, where the cost measure of the matrix representation is a path failure probability, the average cost may be the average path failure probability for communication paths between pairs of nodes of the clusters in the pair of clusters. For example, where a first cluster c1 includes two nodes (n1 and n2) and a second cluster c2 includes two nodes (n3 and n4), the inter-cluster cost for the pair of clusters including c1 and c2 may be computed as [(cost between n1 and n3)+(cost between n1 and n4)+(cost between n2 and n3)+(cost between n2 and n4)/4]. It is noted that, although primarily described with respect to examples in which the pairwise cost between two nodes is the same in both directions, there may be cases in which the pairwise cost between two nodes is different in different directions, in which case both costs may be considered in computer inter-cluster distance (e.g., where a first cluster c1 includes one node (n1) and a second cluster c2 includes two nodes (n2 and n3) and costs between the nodes may be different in different directions, the inter-cluster cost for the pair of clusters including c1 and c2 may be computed as [(cost from n1 to n2)+(cost from n2 to n1)+(cost from n1 to n3)+(cost from n3 to n1)/4]). It is noted that, although primarily described with respect to examples in which it is assumed that there is only a single communication path (and, thus, a single cost) between a first node in the pair of nodes and a second node in the pair of nodes, there may be cases in which there are multiple communication paths (and, thus, multiple costs) between a first node in the pair of nodes and a second node in the pair of nodes and these cases may be handled in various ways (e.g., selecting the minimum cost for use in computing inter-cluster cost, computing an average cost for use in computing the inter-cluster cost, or the like). The manner in which inter-cluster costs may be computed may be further understood by way of reference to the example of FIG. 7.

At step 699, method 600 ends.

Figure 7:
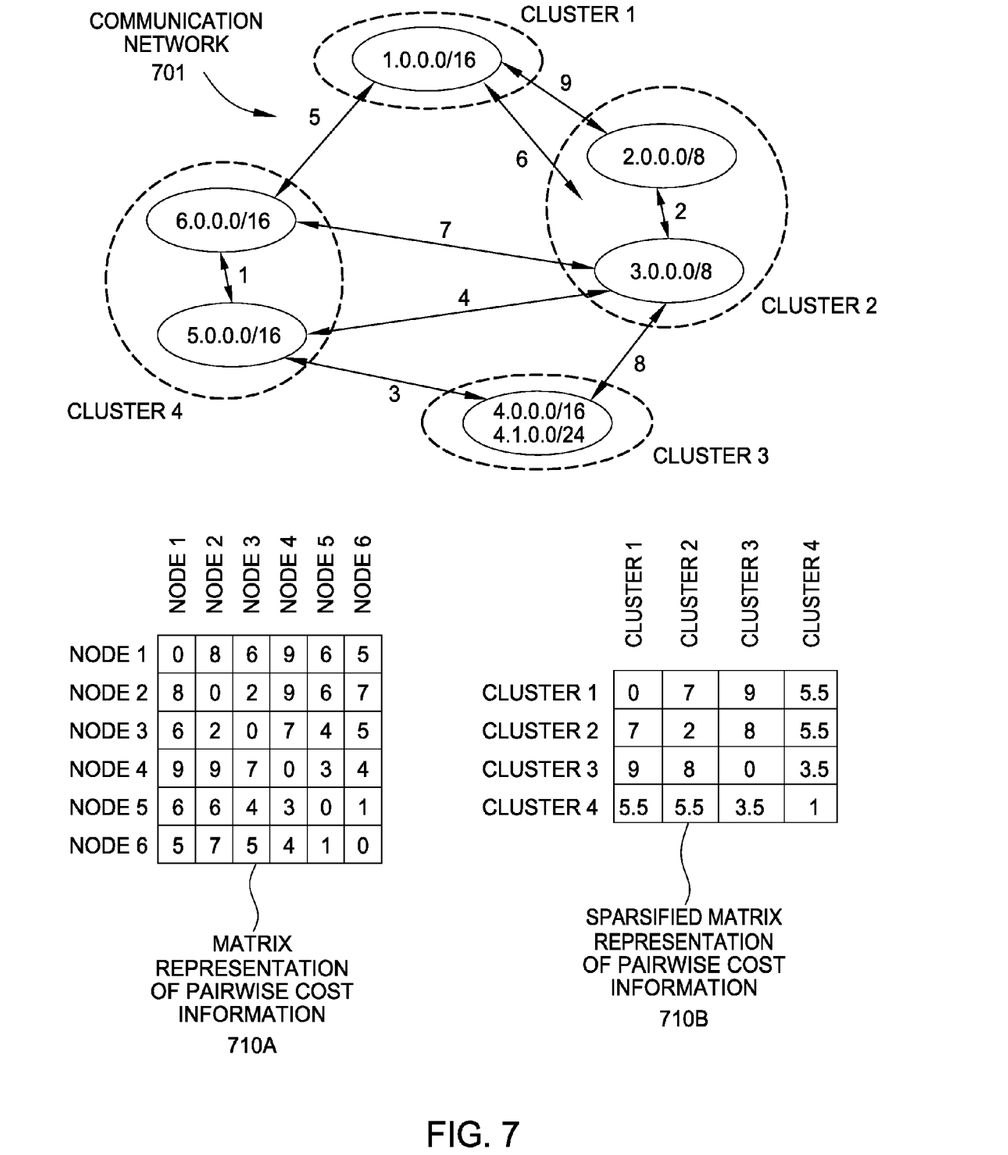
FIG. 7 depicts an exemplary sparsification of a matrix representation of pairwise cost information for nodes of an exemplary communication network to form a sparsified matrix representation of the pairwise cost information for the nodes of the exemplary communication network.

FIG. 7 depicts an exemplary sparsification of a matrix representation of pairwise cost information for nodes of an exemplary communication network to form a sparsified matrix representation of the pairwise cost information for the nodes of the exemplary communication network.

As depicted in FIG. 7, a communication network 701 includes six nodes interconnected via various communication paths to provide a network topology. The six nodes are denoted as 1.0.0.0/16, 2.0.0.0/8, 3.0.0.0/8, 4.0.0.0/16-4.1.0.0/24, 5.0.0.0/16, and 6.0.0.0/16. The communication paths between the nodes have costs associated therewith, respectively.

As further depicted in FIG. 7, the pairwise cost information of communication network 701 is represented using a matrix representation of pairwise cost information 710A, which is a six-by-six matrix including six rows that correspond to the six nodes and six columns that also correspond to the six nodes. The intersection of any given row and column of the matrix representation of pairwise cost information 710A is populated with the minimum cost for communication between the pair of nodes corresponding to that row and column of the matrix representation of pairwise cost information 710A. For example, the first row of the matrix representation of pairwise cost information 710A, which corresponds to the 1.0.0.0/16 node, includes values of [0, 8, 6, 9, 6, 5] which correspond to the costs of the communication paths from the 1.0.0.0/16 node to each of the six nodes. It is noted that the first value is zero, because it represents the minimum cost of communication between the 1.0.0.0/16 node and itself. It is noted that the second value is 8, because, even though there is a direct connection between the 1.0.0.0/16 node and the 2.0.0.0/8 node, the minimum cost for communication between the 1.0.0.0/16 node and the 2.0.0.0/8 node is for the path that traverses the 3.0.0.0/8 node. The values in the other cells of the matrix representation of pairwise cost information 710A may be understood by way of reference to the costs indicated for the various communication paths of the communication network 701.

As further depicted in FIG. 7, the matrix representation of pairwise cost information 710A is sparsified to produce a sparsified matrix representation of pairwise cost information 710B. The matrix representation of pairwise cost information 710A is sparsified to produce sparsified matrix representation of pairwise cost information 710B by grouping the six nodes into four clusters, computing communication costs associated with the clusters based on the grouping of the nodes into the four clusters, and populating the sparsified matrix representation of pairwise cost information 710B based on the computed communication costs associated with the clusters. The first cluster (denoted as Cluster 1) includes the 1.0.0.0/16 node, the second cluster (denoted as Cluster 2) includes the 2.0.0.0/8 and 3.0.0.0/8 nodes, the third cluster (denoted as Cluster 3) includes the 4.0.0.0/16-4.1.0.0/24 node, and the fourth cluster (denoted as Cluster 4) includes the 5.0.0.0/16 and 6.0.0.0/16 nodes. The sparsified matrix representation of pairwise cost information 710B is a four-by-four matrix including four rows that correspond to the four clusters and four columns that also correspond to the four clusters. The intersection of any given row and column of sparsified matrix representation of pairwise cost information 710B is populated with the average minimum cost for communication between node(s) of the cluster(s) corresponding to that row and column of the sparsified matrix representation of pairwise cost information 710B. The diagonal of the sparsified matrix representation of pairwise cost information 710B (from top left to bottom right) corresponds to the four intra-cluster costs computed for the four clusters and includes values of 0 (since Cluster 1 only includes a single node, there is no intra-cluster cost for Cluster 1), 2 (since the pairwise cost between the 2.0.0.0/8 and 3.0.0.0/8 nodes of Cluster 2 is 2), 0 (again, since Cluster 3 only includes a single node, there is no intra-cluster cost for Cluster 3), and 1 (since the pairwise cost between the 2.0.0.0/8 and 3.0.0.0/8 nodes of Cluster 2 is 2). The remaining cells of the sparsified matrix representation of pairwise cost information 710B correspond to the inter-cluster costs computed between the corresponding cluster pairs. For example, the first row of sparsified matrix representation of pairwise cost information 710B, which corresponds to Cluster 1, includes values of [0, 7, 9, 5.5] corresponding to the costs of communication by nodes of Cluster 1 (in this example, only a single node). It is noted that the first value is zero, because, as discussed above, Cluster 1 includes only a single node. It is noted that the second value is 7, which represents the average minimum cost for communication between nodes of Cluster 1 and nodes of Cluster 2 (here, the minimum communication cost between the 1.0.0.0/16 node of Cluster 1 and the 2.0.0.0/8 node of Cluster 2 is 8, the minimum communication cost between the 1.0.0.0/16 node of Cluster 1 and the 3.0.0.0/8 node of Cluster 2 is 6, and, thus, the average minimum cost is (8+6)/2=7). It is noted that the third value is 9, which represents the average minimum cost for communication between nodes of Cluster 1 and nodes of Cluster 3 (here, since Cluster 1 includes only the 1.0.0.0/16 node and Cluster 3 includes only the 4.0.0.0/16-4.1.0.0/24 node, the average minimum cost just is the minimum communication cost of the potential paths between the 1.0.0.0/16 node and the 4.0.0.0/16-4.1.0.0/24 node which, in this example, is 9 for the communication path traversing the 6.0.0.0/16 and 5.0.0.0/16 nodes). It is noted that the fourth value is 5.5, which represents the average minimum cost for communication between nodes of Cluster 1 and nodes of Cluster 4 (here, the minimum communication cost between the 1.0.0.0/16 node of Cluster 1 and the 5.0.0.0/16 node of Cluster 4 is 6, the minimum communication cost between the 1.0.0.0/16 node of Cluster 1 and the 6.0.0.0/16 node of Cluster 4 is 5, and, thus, the average minimum cost is (6+5)/2=5.5). The values in the other cells of the sparsified matrix representation of pairwise cost information 710B may be understood by way of reference to costs of the matrix representation of pairwise cost information 710A and the clustering of the nodes.

As may be seen from FIG. 7, the pairwise cost between a first cluster c1 and a second cluster c2 (where c1 and c2 may be the same cluster) may be used as an approximation of the actual cost between a node x in the first cluster c1 and a node y in the second cluster c2. For example, the pairwise cost between the 1.0.0.0/16 node and the 3.0.0.0/8 node is 6 in the matrix representation of pairwise cost information 710A and is approximated as being 7 in the sparsified matrix representation of pairwise cost information 710B (since the 1.0.0.0/16 node is in Cluster 1 and the 3.0.0.0/8 node is in Cluster 2). Similarly, for example, the pairwise cost between the 4.0.0.0/16-4.1.0.0/24 node and the 6.0.0.0/16 node is 4 in the matrix representation of pairwise cost information 710A and is approximated as being 3.5 in the sparsified matrix representation of pairwise cost information 710B (since the 4.0.0.0/16-4.1.0.0/24 node is in Cluster 3 and the 6.0.0.0/16 node is in Cluster 4). Additionally, FIG. 7 also clearly indicates the reduction in the amount of information that needs to be stored in order to maintain the pairwise cost information for the communication network 701 (namely, storage of 36 data items in matrix representation of pairwise cost information 710A is reduced to storage of 16 data items in sparsified matrix representation of pairwise cost information 710B, which represents approximately a 55% reduction in the amount of information to be stored in order to maintain the pairwise cost information for the communication network 701). Thus, it is clear that a drastic reduction in storage space may be achieved with minimal reductions in the accuracy of the information being stored. It will be appreciated that various tradeoffs between storage space and accuracy may be realized by controlling the clustering of the nodes (e.g., the number of clusters used, the manner in which nodes are assigned to clusters, or the like, as well as various combinations thereof).

Various embodiments of the capability for sparsifying a matrix representation of pairwise cost information for a set of nodes may provide various advantages, at least some of which have been discussed or otherwise indicated above. In at least some embodiments, the capability for sparsifying a matrix representation of pairwise cost information for a set of nodes may obviate the need to sparsify a graph of the nodes in the set of nodes in order to sparsify the associated pairwise cost information for the set of nodes. In at least some embodiments, the capability for sparsifying a matrix representation of pairwise cost information for a set of nodes, when used within the context of a network topology exposure system, may reduce the amount of network topology information exposed without sacrificing the level of detail or accuracy of the network topology information being exposed. In at least some embodiments, the capability for sparsifying a matrix representation of pairwise cost information for a set of nodes may reduce map sizes of maps which may be retrieved and processed by clients (e.g., ALTO network or cost maps retrieved and processed by ALTO clients). In at least some embodiments, the capability for sparsifying a matrix representation of pairwise cost information for a set of nodes provide a more accurate representation of the pairwise cost information for a given map size (e.g., a given ALTO network map size, a given ALTO cost map size, or the like). Various embodiments of the capability for sparsifying a matrix representation of pairwise cost information for a set of nodes may provide various other advantages.

It will be appreciated that, although primarily presented herein with respect to embodiments in which pairwise cost information for a set of nodes is sparsified for a particular type of representation of the pairwise cost information for the set of nodes (namely, for a matrix-based representation of pairwise cost information, where a matrix representation of pairwise cost information for a set of nodes is sparsified to form a sparsified matrix representation of pairwise cost information for the set of nodes), sparsification of pairwise cost information for a set of nodes may be performed for other types of representations of pairwise cost information for the set of nodes (e.g., pairwise costs for respective pairs of nodes of a set of nodes may be represented or maintained using various other types of data structures, memory structures, collections of information, arrangements of information, or the like, as well as various combinations thereof). Accordingly, in at least some embodiments, references herein to a matrix representation of pairwise cost information for a set of nodes and a sparsified matrix representation of the pairwise cost information for the set of nodes may be read more generally as a representation of pairwise cost information for a set of nodes and a sparsified representation of the pairwise cost information for the set of nodes.

It will be appreciated that, although primarily presented herein with respect to embodiments in which pairwise cost information for a set of nodes is sparsified based on representations of the pairwise cost information (e.g., a representation of pairwise cost information for a set of nodes is sparsified to form a sparsified representation of pairwise cost information for the set of nodes), sparsification of a representation of pairwise cost information for a set of nodes also may be considered to be sparsification of the pairwise cost information (e.g., the set of pairwise cost values for respective pairs of nodes of the set of nodes independent of representation). Accordingly, in at least some embodiments, references herein to sparsification of a representation of pairwise cost information for a set of nodes to form a sparsified representation of the pairwise cost information for the set of nodes may be read more generally as sparsification of pairwise cost information for a set of nodes to form sparsified pairwise cost information for the set of nodes.

It will be appreciated that, although primarily presented herein with respect to sparsification of pairwise cost information of a communication network within the context of a topology exposure system configured to expose network topology information of the communication network, various embodiments depicted and described herein may be applied or adapted for sparsifying pairwise cost information of a communication network within various other contexts (e.g., network or service provisioning, network fault management, or the like, as well as various combinations thereof).

It will be appreciated that, although primarily presented herein with respect to sparsification of pairwise cost information within the context of a communication network, various embodiments depicted and described herein may be applied or adapted for sparsifying pairwise cost information in various other types of environments.

It will be appreciated that, although primarily presented herein with respect to sparsification of pairwise cost information, various embodiments depicted and described herein may be applied or adapted for sparsifying various other types of information.

Figure 8:
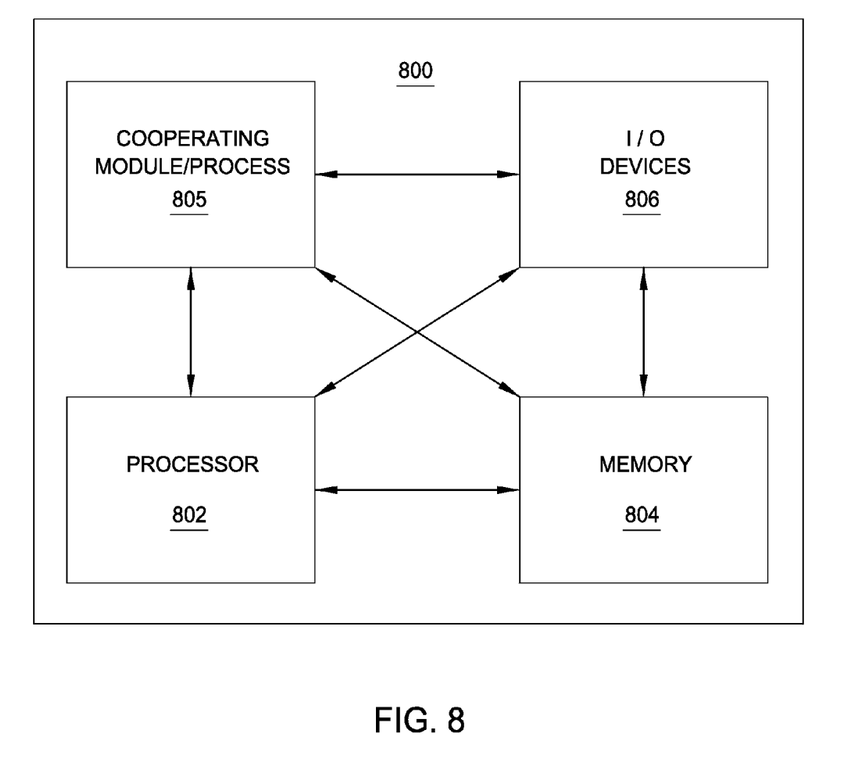
FIG. 8 depicts a high-level block diagram of a computer suitable for use in performing functions described herein.

FIG. 8 depicts a high-level block diagram of a computer suitable for use in performing functions described herein.

The computer 800 includes a processor 802 (e.g., a central processing unit (CPU) and/or other suitable processor(s)) and a memory 804 (e.g., random access memory (RAM), read only memory (ROM), or the like).

The computer 800 also may include a cooperating module/process 805. The cooperating process 805 can be loaded into memory 804 and executed by the processor 802 to implement functions as discussed herein and, thus, cooperating process 805 (including associated data structures) can be stored on a computer readable storage medium, e.g., RAM memory, magnetic or optical drive or diskette, and the like.

The computer 800 also may include one or more input/output devices 806 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 800 depicted in FIG. 8 provides a general architecture and functionality suitable for implementing functional elements described herein and/or portions of functional elements described herein. For example, computer 800 provides a general architecture and functionality that may be suitable for implementing one or more of a node of communication network 110, topology manager 120, topology server 130, a topology client 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive a representation of pairwise cost information for a set of nodes;
determine a clustering of the nodes into a set of clusters; and
sparsify the representation of pairwise cost information for the set of nodes, based on the clustering of the nodes into the set of clusters, to form a sparsified representation of the pairwise cost information for the set of nodes;
wherein, to sparsify the representation of the pairwise cost information for the set of nodes, the processor is configured to:
determine, for at least one of the clusters based on the pairwise cost information for the set of nodes, a respective intra-cluster cost for the respective cluster that is indicative of an average minimum cost between pairs of nodes of the respective cluster; and
determine, for at least one pair of clusters based on the pairwise cost information for the set of nodes, a respective inter-cluster cost for the respective pair of clusters that is indicative of an average minimum cost between pairs of nodes included in respective clusters in the respective pair of clusters;
wherein the sparsified representation of the pairwise cost information for the set of nodes comprises a matrix of cells, wherein ones of the cells associated with respective ones of the clusters include the respective intra-cluster costs for the respective ones of the clusters, wherein ones of the cells associated with respective pairs of the clusters include the respective inter-cluster costs for the respective pairs of the clusters.

2. The apparatus of claim 1, wherein the pairwise cost information is based on at least one cost measure, wherein the at least one cost measure comprises at least one of a measure of distance of paths between node pairs or a measure of failure probability along paths between node pairs.

3. The apparatus of claim 1, wherein the representation of pairwise cost information for the set of nodes comprises an N×N matrix with N being a number of nodes in the set of nodes, wherein the matrix of cells of the sparsified representation of pairwise cost information for the set of nodes comprises a k×k matrix, wherein N>k.

4. The apparatus of claim 1, wherein the processor is configured to:
cluster the nodes of the set of nodes to form the set of clusters.

5. The apparatus of claim 4, wherein, to cluster the nodes of the set of nodes to form the set of clusters, the processor is configured to:
determine a number of clusters (k) in the set of clusters;
create the k clusters by selecting k nodes from the set of nodes and respectively adding the k nodes to the k clusters; and
group remaining nodes of the set of nodes into the k clusters.

6. The apparatus of claim 5, wherein, to create the k clusters by selecting k nodes from the set of nodes and respectively adding the k nodes to the k clusters, the processor is configured to:
select a first node from the set of nodes and add the first node to a first cluster of the k clusters; and
select a second node from the set of nodes and add the second node to a second cluster of the k clusters, wherein the second node is a node of the set of nodes having a maximum distance from the first node of the first cluster.

7. The apparatus of claim 5, wherein, to group any remaining nodes of the set of nodes into the k clusters, the processor is configured to:
for at least one of the remaining nodes of the set of nodes, identify one of the k clusters closest to the one of the remaining nodes of the set of nodes and group the one of the remaining nodes of the set of nodes into the one of the k clusters closest to the one of the remaining nodes of the set of nodes.

8. A method, comprising:
receiving, via a processor, a representation of pairwise cost information for a set of nodes;

determining, by the processor, a clustering of the nodes into a set of clusters; and sparsifying, by the processor, the representation of pairwise cost information for the set of nodes, based on the clustering of the nodes into the set of clusters, to form a sparsified representation of the pairwise cost information for the set of nodes;

wherein sparsifying the representation of the pairwise cost information for the set of nodes comprises:

determining, for at least one of the clusters based on the pairwise cost information for the set of nodes, a respective intra-cluster cost for the respective cluster that is indicative of an average minimum cost between pairs of nodes of the respective cluster; and determining, for at least one pair of clusters based on the pairwise cost information for the set of nodes, a respective inter-cluster cost for the respective pair of clusters that is indicative of an average minimum cost between pairs of nodes included in respective clusters in the respective pair of clusters;

wherein the sparsified representation of the pairwise cost information for the set of nodes comprises a matrix of cells, wherein ones of the cells associated with respective ones of the clusters include the respective intra-cluster costs for the respective ones of the clusters, wherein ones of the cells associated with respective pairs of the clusters include the respective inter-cluster costs for the respective pairs of the clusters.

9. A non-transitory computer-readable storage medium storing instructions which, when executed by a computer, cause the computer to perform a method, the method comprising:

receiving a representation of pairwise cost information for a set of nodes;

determining a clustering of the nodes into a set of clusters; and sparsifying the representation of pairwise cost information for the set of nodes, based on the clustering of the nodes into the set of clusters, to form a sparsified representation of the pairwise cost information for the set of nodes;

wherein sparsifying the representation of the pairwise cost information for the set of nodes comprises:

determining, for at least one of the clusters based on the pairwise cost information for the set of nodes, a respective intra-cluster cost for the respective cluster that is indicative of an average minimum cost between pairs of nodes of the respective cluster; and determining, for at least one pair of clusters based on the pairwise cost information for the set of nodes, a respective inter-cluster cost for the respective pair of clusters that is indicative of an average minimum cost between pairs of nodes included in respective clusters in the respective pair of clusters;

wherein the sparsified representation of the pairwise cost information for the set of nodes comprises a matrix of cells, wherein ones of the cells associated with respective ones of the clusters include the respective intra-cluster costs for the respective ones of the clusters, wherein ones of the cells associated with respective pairs of the clusters include the respective inter-cluster costs for the respective pairs of the clusters.

* * * * *